(12) United States Patent
Al-Ghareeb

(10) Patent No.: US 10,167,703 B2
(45) Date of Patent: Jan. 1, 2019

(54) OPTIMAL WELL PLACEMENT UNDER CONSTRAINTS

(71) Applicant: Saudi Arabian Oil Company, Dhahran (SA)

(72) Inventor: Zeid M. Al-Ghareeb, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 307 days.

(21) Appl. No.: 15/087,034

(22) Filed: Mar. 31, 2016

(65) Prior Publication Data

US 2017/0284174 A1  Oct. 5, 2017

(51) Int. Cl.
| | |
|---|---|
| *E21B 41/00* | (2006.01) |
| *G06F 17/50* | (2006.01) |
| *E21B 49/00* | (2006.01) |
| *E21B 47/00* | (2012.01) |

(52) U.S. Cl.
CPC ...... *E21B 41/0092* (2013.01); *G06F 17/5004* (2013.01); *G06F 17/5009* (2013.01); *G06F 17/509* (2013.01); *E21B 47/00* (2013.01); *E21B 49/00* (2013.01); *G06F 2217/06* (2013.01)

(58) Field of Classification Search
CPC .......... E21B 43/00; E21B 43/16; E21B 43/30; E21B 47/00; G06Q 10/04; G06F 17/5009; G06F 17/509; G06F 2217/06
USPC ...................... 703/2, 10; 166/250.01; 175/50
See application file for complete search history.

(56) References Cited

U.S. PATENT DOCUMENTS

| | | | |
|---|---|---|---|
| 6,549,879 B1* | 4/2003 | Cullick | E21B 49/00 702/11 |
| 7,430,501 B2 | 9/2008 | Feraille | |
| 7,980,327 B2* | 7/2011 | Benischek | E21B 43/16 166/250.01 |
| 8,532,968 B2 | 9/2013 | Oury | |
| 8,543,364 B2 | 9/2013 | Liu | |
| 2004/0054564 A1* | 3/2004 | Fonseca | G06Q 10/04 705/7.23 |
| 2009/0125288 A1* | 5/2009 | Main | E21B 43/00 703/10 |
| 2011/0191080 A1* | 8/2011 | Klie | G06F 17/50 703/10 |

(Continued)

FOREIGN PATENT DOCUMENTS

WO    2008041885    4/2008

OTHER PUBLICATIONS

Emerick et al., "Well Placement Optimization Using a Genetic Algorithm with Nonlinear Constraints," SPE Reservoir Simulation Symposium (SPE 118808); Jan. 1, 2009; 20 pages.

(Continued)

*Primary Examiner* — Jonathan Han
(74) *Attorney, Agent, or Firm* — Fish & Richardson P.C.

(57) ABSTRACT

Information associated with a plurality of constraints for well placement is received. For each of the plurality of constraints, information associated with the constraint is converted into a binary matrix. An overall constraint matrix is determined by convolving the binary matrices associated with the plurality of constraints. Feasible regions are determined based on the overall constraint matrix. Optimal well locations are determined within the feasible regions. The optimal well locations and a number of the optimal wells are output.

17 Claims, 15 Drawing Sheets

(56) References Cited

U.S. PATENT DOCUMENTS

| | | | |
|---|---|---|---|
| 2014/0214387 A1* | 7/2014 | Tilke | E21B 43/305 |
| | | | 703/10 |
| 2014/0365192 A1 | 12/2014 | Cheng | |
| 2015/0160369 A1 | 6/2015 | Awotunde | |
| 2015/0233214 A1 | 8/2015 | Dusterhoft | |
| 2015/0339411 A1* | 11/2015 | Raphael | E21B 43/30 |
| | | | 703/1 |

OTHER PUBLICATIONS

International Search Report and Written Opinion of the International Searching Authority issued in International Application No. PCT/US2017/018050 dated May 10, 2017; 12 pages.

\* cited by examiner

Algorithm 1: Depth First Search

Input : A binary array containing locations of feasible regions
Output: U array containing numbered feasible regions ID ← 1
stack ← [ ]
{rows, cols} ← size(A)
for $i$ := rows do
   for $j$ := cols do
      if ($A(i,j) == 0$) then
         Declare $A(i,j)$ as visited
      else if $A(i,j)$ is visited then
         Go back to beginning of for-loop
      else
         stack ← [i,j]
         while *stack not empty* do
            loc := ← stack(1,:)
            stack(1,:) ← empty
            if $loc(i,j)$ is visited then
               Go back to beginning of while-loop
            end
            Declare $loc(i,j)$ as visited
            Determine neighboring cells $\phi_i$
            stack ← feasible($\phi_i$) and not visited($\phi_i$)
            All members in stack ← ID
         ID := ID + 1
      end
   end
end

FIG. 3

| 0 | 0 | 0 | 1 | 0 | 0 | 0 | 0 | 0 | 0 |
|---|---|---|---|---|---|---|---|---|---|
| 0 | 0 | 0 | 1 | 1 | 1 | 0 | 0 | 0 | 0 |
| 0 | 0 | 0 | 1 | 1 | 0 | 0 | 0 | 0 | 0 |
| 0 | 1 | 0 | 0 | 0 | 0 | 0 | 0 | 0 | 0 |
| 1 | 1 | 0 | 0 | 0 | 0 | 0 | 0 | 0 | 0 |
| 1 | 1 | 0 | 0 | 0 | 0 | 0 | 1 | 0 |   |
| 1 | 0 | 0 | 0 | 0 | 1 | 1 | 1 | 0 |   |
| 0 | 0 | 0 | 0 | 0 | 1 | 1 | 1 | 0 |   |
| 0 | 0 | 0 | 0 | 0 | 1 | 1 | 0 | 0 |   |
| 0 | 0 | 0 | 0 | 0 | 0 | 1 | 0 | 0 | 0 |

FIG. 4

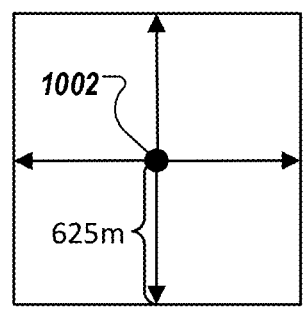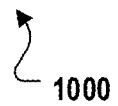
FIG. 10

OPTIMAL WELL PLACEMENT UNDER CONSTRAINTS

BACKGROUND

Well placement optimization plays a major role in an efficient recovery of hydrocarbon resources. Reservoir management decision-making relies heavily on an ability to determine optimal well locations that will yield the largest financial return. While manual determination of well locations based on common sense is still commonly used in the petroleum industry, reservoir management teams are beginning to appreciate the use of automatic optimization tools for well placement. However, determination of optimal well locations is challenging in a complex and heterogeneous system. First, in many instances, flow properties of the reservoir are not known with a reasonable degree of accuracy, making flow performance prediction difficult, and therefore management and economic analyses are misleading. Second, even if reservoir properties were known with a reasonable degree of accuracy, the objective function of well placement optimization, for example, a net present value (NPV) or recovery factor, is often complex, non-convex, and in many cases multi-modal, which makes the search for an optimal solution challenging. Third, the optimization problem space is often large and it, in fact, grows drastically with an increasing number of design variables. Thus, in large reservoirs where several production and injection wells are to be placed, the problem of finding an optimal configuration of wells can be very challenging.

SUMMARY

The present disclosure relates to optimal well placement under constraints.

Information associated with a plurality of constraints for well placement is received. For each of the plurality of constraints, information associated with the constraint is converted into a binary matrix. An overall constraint matrix is determined by convolving the binary matrices associated with the plurality of constraints. Feasible regions are determined based on the overall constraint matrix. Optimal well locations are determined within the feasible regions. The optimal well locations and a number of the optimal wells are output.

Some implementations can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

For example, in one implementation, a computer-implemented method includes: receiving information associated with a plurality of constraints for well placement; for each of the plurality of constraints, converting information associated with the constraint into a binary matrix; determining an overall constraint matrix by convolving the binary matrices associated with the plurality of constraints; determining feasible regions based on the overall constraint matrix; determining optimal well locations within the feasible regions; and outputting the optimal well locations and a number of the optimal wells.

The foregoing and other implementations can each optionally include one or more of the following features, alone or in combination:

A first aspect, combinable with the general implementation, wherein converting information associated with the constraint into a binary matrix including assigning a value of one to an element in the binary matrix if a corresponding location honors the constraint and a value of zero otherwise.

A second aspect, combinable with the general implementation, wherein convolving the binary matrices associated with the plurality of constraints including multiplying corresponding elements from the binary matrices.

A third aspect, combinable with the general implementation, wherein the feasible regions are determined by using a depth-first search algorithm.

A fourth aspect, combinable with the general implementation, wherein each of the feasible regions is assigned a unique identifier.

A fifth aspect, combinable with the general implementation, wherein the plurality of constraints include a minimum well separation distance.

A sixth aspect, combinable with the general implementation, comprising iteratively determining optimal well locations that includes: at each iteration, determining one optimal well location within each of the feasible regions; in response to the determined optimal well locations, updating the binary matrix associated with the constraint of the minimum well separation distance; updating the overall constraint matrix based on the updated binary matrix; and updating feasible regions for well placement for a next iteration.

The subject matter described in this specification can be implemented in particular implementations so as to realize one or more of the following advantages. First, the described subject matter optimizes well placement by honoring imposed constraints and can be used for both developed and undeveloped petroleum reservoirs/fields, especially for those that are complex and realistic and associated with a large number of constraints. The imposed constraints can be associated with reservoir properties and reservoir management strategies. Second, the described approach is computationally efficient and uses a small computational runtime that reduces the search space to regions of a field that are feasible for well placement. Computational efficiency is achieved through preventing unnecessary trial and error of well placement in infeasible regions. Third, the described subject matter provides a general constraint handling methodology applicable to any type and number of constraints. Fourth, unlike existing approaches which place a fixed number of wells with a particular reservoir/field, the described approach optimizes the number of wells to be placed based on a size and other properties of the particular reservoir. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 3 illustrates other example pseudo code for a DFS algorithm, according to an implementation.

FIG. 4 illustrates example input to a DFS algorithm, according to an implementation.

FIG. 10 illustrates a square mesh surrounding an existing well with a distance equivalent to a minimum well separation distance, according to an implementation.

Like reference numbers and designations in the various drawings indicate like elements.

DETAILED DESCRIPTION

Figure 1:
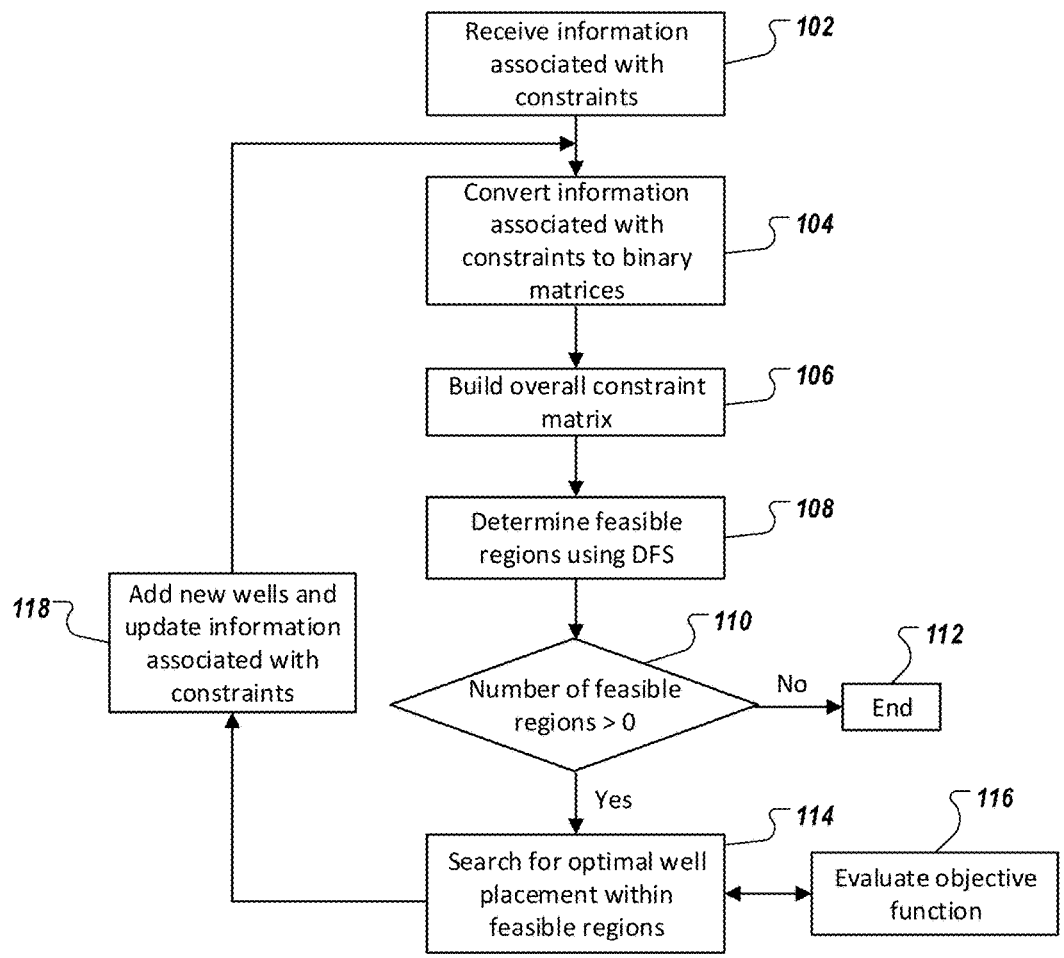
FIG. 1 is a flow chart of an example method for optimal well placement under constraints, according to an implementation.

The present detailed description relates to optimal well placement under constraints and is presented to enable any person skilled in the art to make, use, and practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described or illustrated implementations, but is to be accorded the widest scope consistent with the principles and features disclosed herein.

Well placement is important for an efficient recovery of hydrocarbon resources. Existing approaches of well placement typically work for undeveloped or new fields where no constraints are imposed, but are not suitable for developed or mature fields where a lot of existing wells are already in place and a vast region of the reservoir is already swept. The existing approaches do not honor constraints such as existing wells, minimum well separation distance and minimum oil column thickness, causing search algorithms to either reach unrealistic results, such as placing two wells at a same location or incur a high computation cost by searching the whole field including the regions that are already swept.

In the existing approaches, a well placement optimization workflow typically has two components: 1) a reservoir simulator modelling the reservoir and 2) an optimization algorithm adjusting well locations. A user first provides an initial set of well locations. The reservoir simulator then evaluates performance of these wells. A specific objective function, for example, a net present value (NPV) or recovery factor, is used to quantify the well performance. The reservoir simulator computes a value of the objective function and passes to the optimization algorithm. In light of the value of the objective function, the optimization algorithm provides an improved set of well locations. This workflow is inefficient for cases when prior knowledge of factors that may affect well performance is unavailable. Such prior knowledge may include rock quality (for example, permeability and porosity), fluid saturation, and minimum well-separation distance. Rock quality has a direct impact on well performance, since wells placed in low porosity and permeability regions usually have low performance. In a similar manner, minimum well separation distance needs to be met to minimize well interference (for example, wells stealing production from other wells). In theory, the optimization algorithm should reach a solution that places all wells in good rock quality regions with optimal well-separation distance. However, this would require a significant number of expensive reservoir simulation runs since the search space is large (for example, searching the whole reservoir including regions with high and low rock quality) which may cause a high computational cost especially for large reservoirs.

The described approach in this disclosure optimizes well placement by honoring constraints and reducing the search space to regions feasible for well placement to lower the computational cost. Besides the two components (that is, the reservoir simulator and the optimization algorithm) described above, the workflow of the described approach has an additional feasibility component that discretizes the full reservoir and identifies feasible regions based on imposed constraints. The feasibility component is general and flexible such that it can handle any imposed constraint, for example, minimum oil-column thickness, minimum net-to-gross, minimum well separation distance, minimum permeability, oil-saturation limit, etc.

To identify feasible regions, the feasibility component first converts information associated with each constraint into a binary matrix of zeros and ones. A value of one indicates that a constraint is honored at a specific location and a value of zero otherwise. A single binary matrix is constructed for each constraint showing areas that honor that specific constraint. Since some areas may honor one constraint but not the other, final areas honoring all constraints can be obtained by convoluting all the binary matrices. The convoluted matrix, also called overall constraint matrix, can be used to locate feasible regions within the reservoir. In order to efficiently place wells within the feasible regions, a depth-first search (DFS) procedure can be used. DFS uses the overall constraint matrix to identify feasible regions and tag each feasible region with a unique identifier (ID). DFS supplies the feasible regions with IDs and boundaries to the optimization algorithm that is capable of optimally placing wells within these regions. The optimization algorithm links with the reservoir simulator to evaluate well performance. The optimization algorithm sends candidate wells to the reservoir simulator for evaluation and receives the results, for example, the ultimate recovery factor, to plan next iteration and to improve well locations.

FIG. 1 is a flow chart of an example method 100 for optimal well placement under constraints, according to an implementation. For clarity of presentation, the description that follows generally describes method 100 in the context of FIGS. 2-15. However, it will be understood that method 100 may be performed, for example, by any suitable system, environment, software, and hardware, or a combination of systems, environments, software, and hardware as appropriate. In some implementations, various steps of method 100 can be run in parallel, in combination, in loops, or in any order.

At 102, a set of constraints and information associated with the constraints are received. Examples of constraint can be minimum oil column thickness, minimum well-separation distance, minimum permeability, oil saturation limit, etc. For example, the constraints may indicate that wells should be drilled with an oil column thickness larger than 5 feet and a minimum well separation distance of 250 m. In some cases, reservoir management strategies, such as placing wells in areas of an oil saturation larger than 0.5, can be cast as constraints. Similarly, placing wells based on reservoir properties, such as placing wells in areas of good rock quality with a minimum permeability, can also be cast as constraints.

In a typical implementation, information associated with a constraint can be received in a form of text file or image that may be extracted from a reservoir model. For example, if the constraint is to place wells at an oil saturation larger than 0.5, a text file may be used to include numerical values of oil saturation at different locations. In some cases, an image can be used and an intensity or a color of a pixel can indicate the oil saturation at a specific location. The size of the text or image file can depend on a size of the reservoir. In some cases, the reservoir can be divided into grids. For example, for a reservoir size of 50 km-by-50 km and a grid size of 100 m-by-100 m, the reservoir can be represented by 500-by-500 grids. In this case, the constraint information can be included in a text file having a matrix of 500-by-500 elements and each element represents the numerical value of the oil saturation at a corresponding location. Similarly, an image having 500-by-500 pixels can be used and the intensity of color of the pixel represents the oil saturation. As will be understood by those of ordinary skill in the art, information associated with the constraint can also be received in other forms other than a text file or image. From 102, method 100 proceeds to 104.

At 104, information associated with each constraint is converted to a binary matrix of zeros and ones. The binary matrix can have a size equals to the number of grids representing the reservoir. In typical implementations, a value of one indicates that the constraint is honored at that specific location, and a value of zero indicates the constraint unsatisfied. This process is repeated for every constraint so that the number of binary matrices is equal to the number of constraints imposed. In the example of drilling wells at an oil saturation larger than 0.5, an element in the binary matrix will have a value of one if the corresponding element in the text file has a value large than 0.5, and a value of zero otherwise. From 104, method 100 proceeds to 106.

At 106, a final binary matrix, called overall constraint matrix, is generated by convoluting all the binary matrices. In a typical implementation, an element in the overall constraint matrix is obtained by multiplying the corresponding elements from all the binary matrices. The overall constraint matrix is also a binary matrix where a value of one indicates that all imposed constraints are honored at that specific location. In other words, the ones in the overall constraint matrix indicate feasible locations for well placement. From 106, method 100 proceeds to 108.

At 108, feasible regions are determined using a DFS procedure. A feasible region can be defined as a connected body of feasible locations that can fit at least one well. Details of the DFS algorithm will be described in FIG. 2. The idea of DFS is to traverse the binary overall constraint matrix from left to right and from top to bottom for any connected region that has elements of one. DFS traverses the overall constraint matrix by selecting a starting element and exploring as far as possible among neighbors for elements with a value of one before backtracking. DFS identifies the feasible regions and tags each feasible region with a unique ID. Feasible regions that are shorter than a length of a well may be discarded. As will be discussed below, tagging each feasible region with a unique ID can prevent a horizontal well placement where the horizontal section starts at one feasible region and ends in another while most of the section intersects an infeasible region. For computational efficiency, the described optimal well placement, instead of searching the whole reservoir, searches identified feasible regions to place wells as infeasible regions would not result in good well performance. From 108, method 100 proceeds to 110.

At 110, if there is no feasible region identified at 108, method 100 proceeds to 112 which ends the method 100. If there is at least one feasible region identified at 108, method 100 proceeds to 114.

At 114, the optimization algorithm searches for optimal well locations within the feasible regions. Information of the feasible regions obtained at 108, such as boundaries and IDs of the feasible regions, can be provided to the optimization algorithm. In some implementations, the optimization algorithm places wells within each feasible region to prevent a horizontal well starting at one feasible region and ending in another while most of the horizontal section intersecting an infeasible region. In some implementations, the optimization algorithm can also place wells iteratively. For example, for each iteration, the algorithm finds one optimal well location for each feasible region to ensure a realistic well placement that wells do not intersect with each other.

The optimization algorithm at 114 can also communicate with a reservoir simulator at 116 to evaluate performance of the well placement determined at 114. For example, the performance can be quantified by evaluating objective functions such as NPV. The objective function can be computed at 116 and the value can be passed to the optimization algorithm at 114. Based on the value of the objective function, the optimization algorithm at 114 may provide an improved set of well locations. From 114, method 100 proceeds to 118.

At 118, new wells determined at 114 are added to existing wells and information associated with constraints may be updated due to the newly added wells. For example, if a minimum well separation distance is imposed, the binary matrix associated with the well separation constraint may be updated to reflect that locations near the newly added wells may become infeasible. After 118, method 100 proceeds back to 104 to perform a new iteration to place more wells. For example, the overall constraint matrix is updated due to the new wells, and feasible regions are updated by DFS which are supposed to be smaller than the previous iteration due to the newly added wells. The iterative process continues until there is no feasible region left. The final results of method 100 can include a number of new wells as well as the locations of these new wells.

Figure 2:
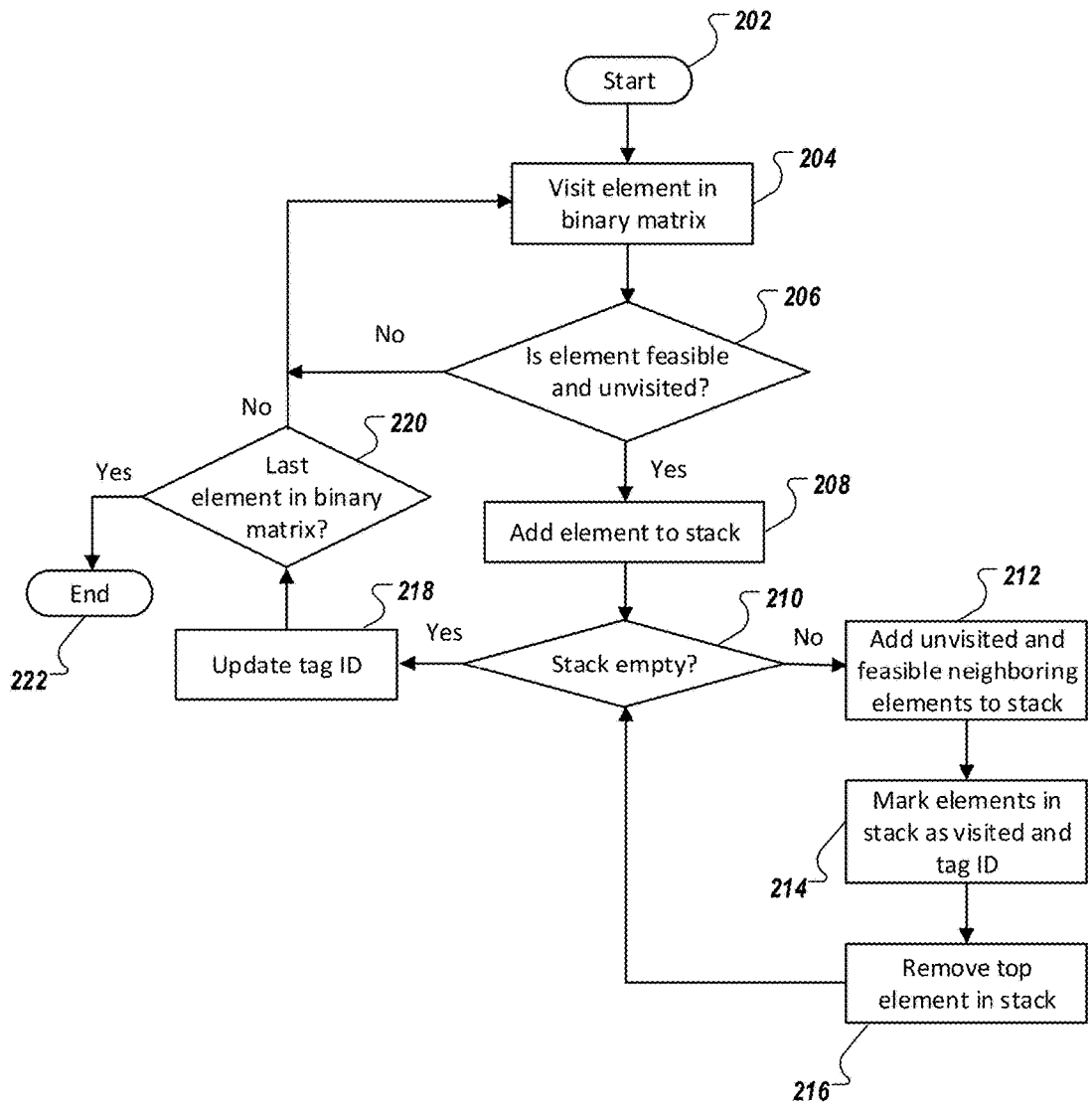
FIG. 2 is a flow chart of an example method using a depth-first search (DFS) to identify feasible regions from an overall constraint matrix, according to an implementation.

Turning to FIG. 2, FIG. 2 is a flow chart of an example method 200 using a DFS to identify feasible regions from an overall constraint matrix, according to an implementation. For clarity of presentation, the description that follows generally describes method 200 in the context of FIGS. 1 and 3-15. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, method 200 starts. For example, a binary overall constraint matrix can be received at 202. In typical implementations, the ones in an overall constraint matrix can indicate feasible locations honoring all imposed constraints and the zeros can indicate infeasible locations. At a beginning of method 200, all elements in the overall constraint matrix can be marked as unvisited (for example, using a zero value). The feasible region ID can be initialized to, for example, a value of 1. In other implementations, other values can be used in the overall constraint matrix to indicate feasible/infeasible locations, to indicate whether an element in the constraint matrix is unvisited, and as a feasible region ID. From 202, method 200 proceeds to 204.

At 204, an element from the overall constraint matrix is selected to visit. For example, at the beginning of method 200, the first element to visit can be the upper-left corner element of the overall constraint matrix. From 204, method 200 proceeds to 206.

At 206, a determination is made as to whether the selected element at 204 corresponds to a feasible location (for example, by checking if the selected element has a value of one) and is marked as unvisited. If the element corresponds to a feasible location and is marked as unvisited, method 200 proceeds to 208. Otherwise, the element is marked as visited so that there is no need to again visit the element and method 200 returns to 204 to select a next element from the overall constraint matrix to visit. In some implementations, the next element can be selected based on an order from left-to-right and from top-to-bottom starting from the upper-left corner element of the overall constraint matrix.

At 208, the feasible and unvisited element determined at 206 is added to a stack. From 208, method 200 proceeds to 210.

At 210, a determination is made as to whether the stack is empty, for example, by checking if there is any element left in the stack. If the stack is not empty, method 200 proceeds to 212. Otherwise, method 200 proceeds to 218.

At 212, an element at the top of the stack is selected and its neighboring elements are examined. For example, in a two-dimensional implementation, eight neighboring elements adjacent to the top element of the stack can be collected to determine if there are any unvisited and feasible neighboring elements around the top element. For example, assume that notation (X,Y) refers to an element at row X and column Y in the overall constraint matrix. If the top element of the stack is element (2,2) of the overall constraint matrix, the eight neighboring elements around element (2,2) are elements (1,1), (1,2), (1,3), (2,1), (2,3), (3,1), (3,2), and (3,3) of the overall constraint matrix. In other implementations, and as will be understood by those of ordinary skill in the art, other numbers of neighboring elements can be configured depending upon the configuration of the overall constraint matrix. If there are unvisited and feasible neighboring elements, these neighboring elements can be added to the stack. The neighboring elements that are not added to the stack can be marked as visited. From 212, method 200 proceeds to 214. In other implementations, and as will be understood by those of ordinary skill in the art, three or more dimensions can be handled by the developed DFS.

At 214, the elements in the stack are marked as visited and assigned the feasible region ID. From 214, method 200 proceeds to 216.

At 216, the element at the top of the stack is removed. From 216, method 200 returns to 210 to 214 to examine the next top element in the stack and its neighboring elements if the stack is not empty so that a connected body of feasible locations can be identified.

At 218, the feasible region ID is updated if the stack is empty. For example, the feasible region ID can be increased by 1 and the method begins to search for the next feasible region with the new ID. From 218, method 200 proceeds to 220.

At 220, a determination is made as to whether the most-recently visited element at 204 is the last element in the overall constraint matrix. For example, if elements are visited in an order from left-to-right and from top-to-bottom starting from the upper-left corner element, the last element is the lower-right corner element. If the most-recently visited element at 204 is not the last element in the overall constraint matrix, method 200 returns to 204 to visit the next element in the overall constraint matrix. Otherwise, all the elements in the overall constraint matrix have been visited and method 200 ends at 222. In some implementations, at 220 a determination is made as to whether there are any unvisited elements in the overall constraint matrix. If there are unvisited elements left, method 200 returns to 204 to examine the next unvisited element in the overall constraint matrix. Otherwise, method 200 ends at 222.

Following is one example of pseudo code for the DFS algorithm:
- 100 Starting from upper left corner of a binary overall constraint matrix:
- 200 If element value is zero, mark as visited (no need to visit again)
- 300 If element value is one:
- 400 Assign ID (starting with ID=1)
- 500 Collect all neighboring elements
- 600 If a neighboring element is zero, mark as visited
- 700 If a neighboring element is one, assign ID (similar to above ID) and make as visited.
- 800 Increase ID value and repeat In the above pseudo code DFS is applied to an overall constraint matrix to tag each feasible region with a unique ID. DFS searches each element in the overall constraint matrix. Elements that represent feasible locations are added to a stack whereas elements that represent infeasible locations are discarded. For each element in the stack, the eight immediate neighboring elements are visited. If any of the neighboring elements are feasible, it is added to the stack and tagged with an ID similar to the center element and marked as visited. The search continues until the stack is empty. Feasible regions that are shorter than a length of a well can be discarded. As will be understood by those of ordinary skill in art, other forms of DFS algorithms consistent with this disclosure are possible and considered to be within the scope of this disclosure.

FIG. 3 illustrates other example pseudo code 300 for a DFS algorithm, according to an implementation. The DFS algorithm 302 is applied to a binary matrix A to identify feasible regions and assign each feasible region a unique ID.

Figure 5:
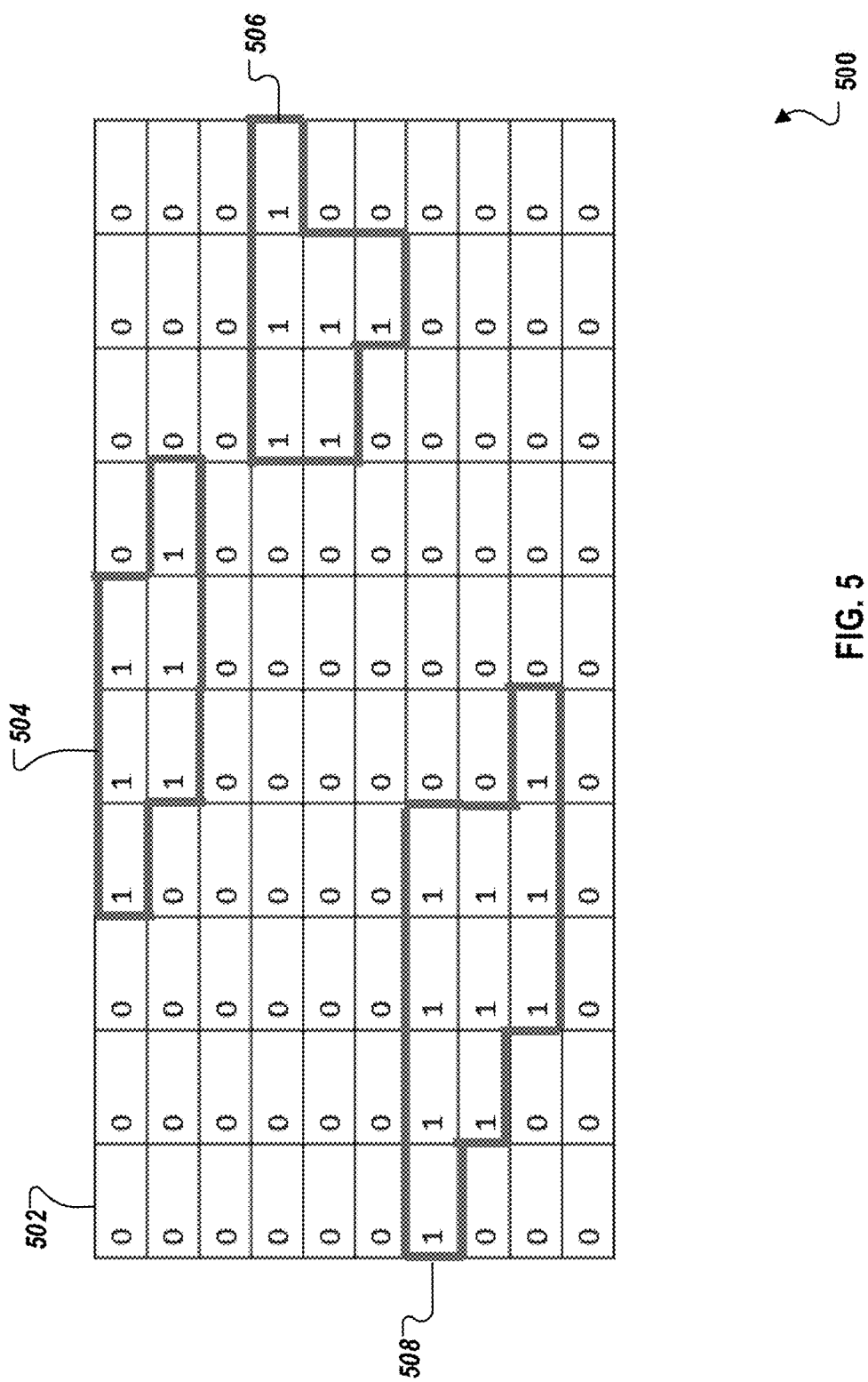
FIG. 5 illustrates example feasible regions in an overall constraint matrix, according to an implementation.
Figure 6:
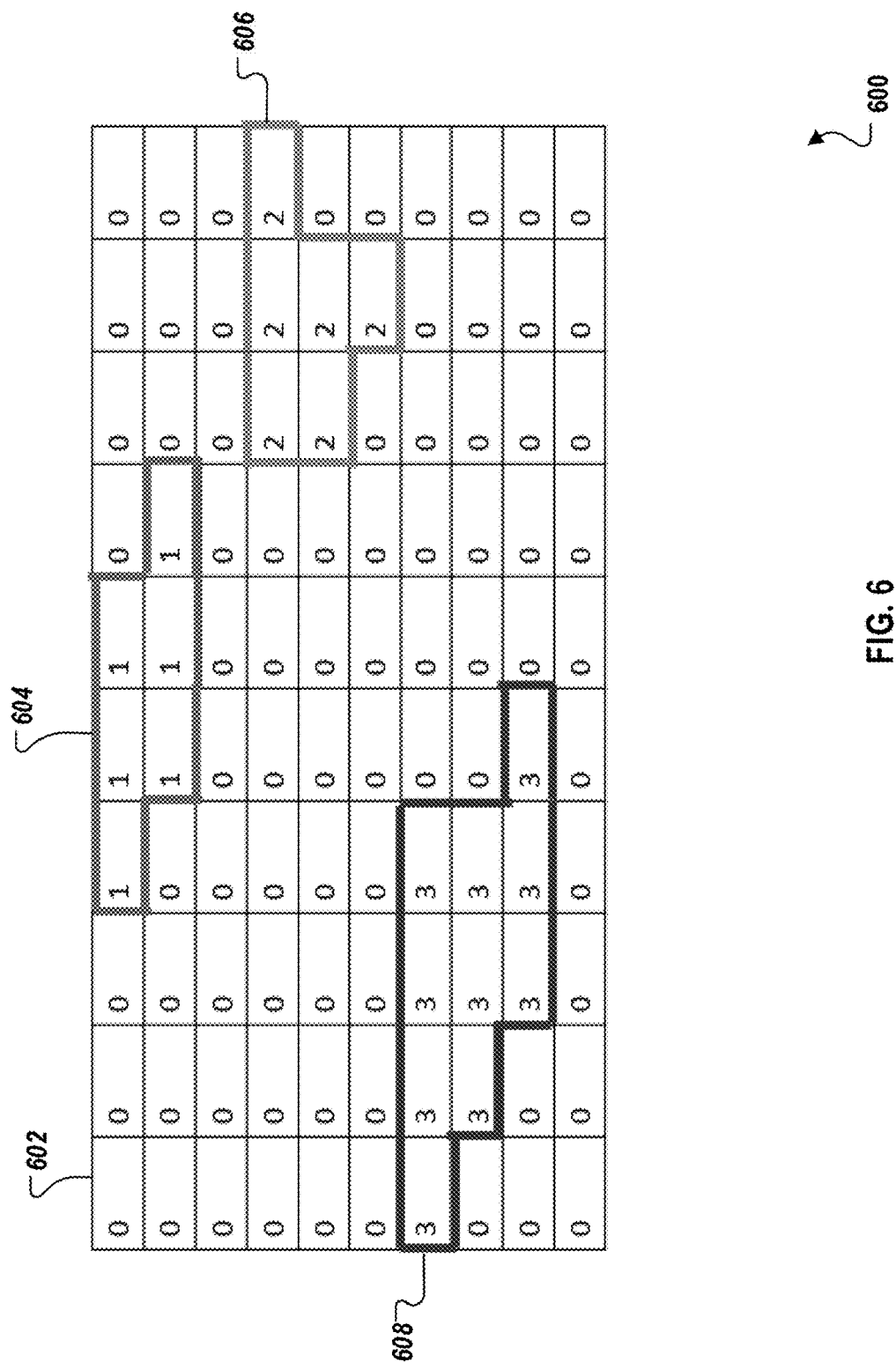
FIG. 6 illustrates example output of a DFS algorithm, according to an implementation.

FIGS. 4-6 illustrate example input and output of a DFS algorithm. FIG. 4 illustrates example input 400 to a DFS algorithm, according to an implementation. The input 400 can be a binary overall constraint matrix 402 having 10-by-10 elements. The elements with a value of one indicate feasible locations and zero for infeasible locations.

FIG. 5 illustrates example feasible regions 500 in an overall constraint matrix, according to an implementation. The binary overall constraint matrix 502 includes three feasible regions 504, 506, and 508. Each feasible region is identified as a connected body of feasible locations, that is, elements with a value of one.

FIG. 6 illustrates example output 600 of a DFS algorithm, according to an implementation. The output 600 includes one or more identified feasible regions and assigned IDs. For example, the DFS algorithm searches the binary overall constraint matrix 602 and identifies three feasible regions 604, 606, and 608, with IDs 1, 2, and 3, respectively.

FIGS. 7-15 illustrate an application of the described optimal well placement to a simulation model of a reservoir field. The reservoir field has a total area of 50 km-by-76 km and is modelled by 399-by-607 grid blocks, each grid block having a dimension of 125 m-by-125 m. The primary objective is to maximize recovery factor by optimally placing new wells in un-swept regions. Two constraints are considered in this application: a minimum well separation distance of 625 m and placing wells in areas of an oil saturation level higher than 0.5.

Figure 7:
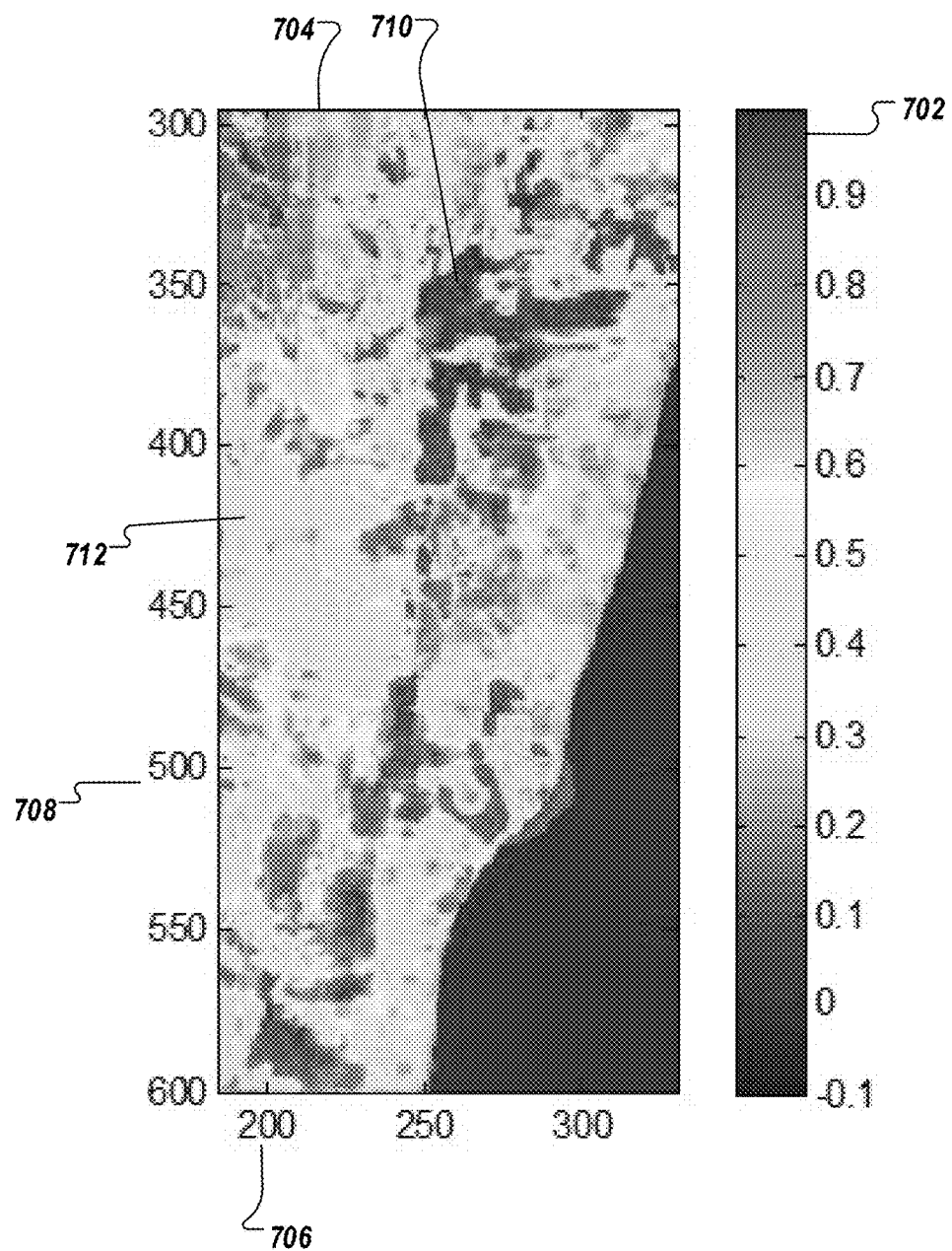
FIG. 7 illustrates an oil saturation map of a reservoir field, according to an implementation.

FIG. 7 illustrates an oil saturation map 700 of the reservoir field, according to an implementation. Color bar 702 depicts a mapping between colors of a color spectrum and a continuous range of an oil saturation level (for example, similar to that of FIGS. 9 and 14). Image 704 indicates oil saturation levels at different locations in the field. In the illustrated implementation, red areas indicate high oil saturation (darker red indicates a higher oil saturation level) while blue areas indicate low oil saturation (darker blue indicates a lower oil saturation level). For example, the oil saturation level is above 0.9 at location 710 and about 0.3 at location 712. Horizontal index 706 and vertical index 708 represent a grid block index in both longitudinal and latitudinal directions, respectively. The image 704 represents a portion of the field with the grid block index ranging from about 185 to 325 in the longitudinal direction and from about 300 to 600 in the latitudinal direction, out of a total of 399 grid blocks in the longitudinal direction and a total of 607 grid blocks in the latitudinal direction.

Figure 8:
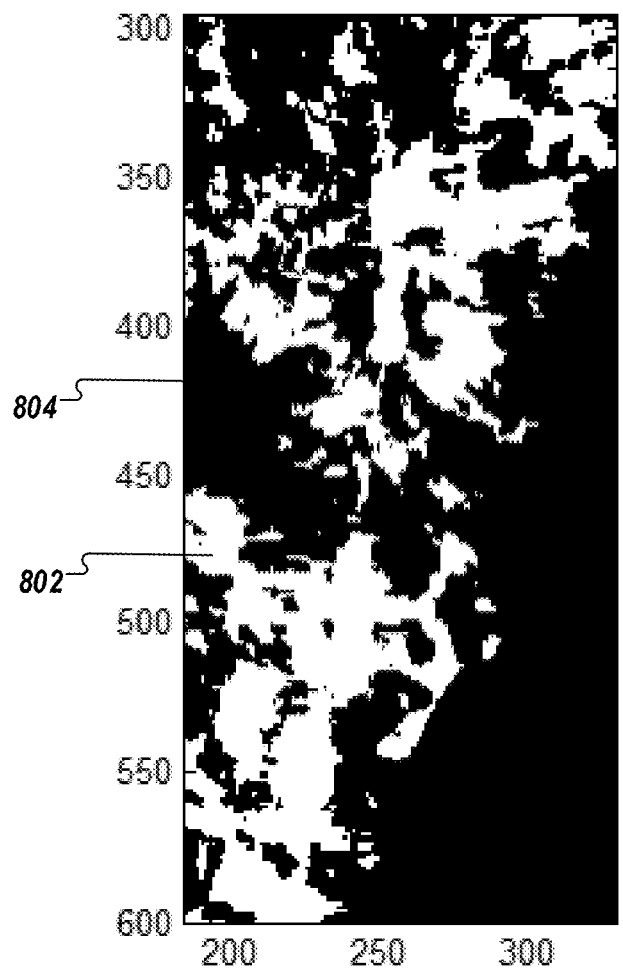
FIG. 8 illustrates a visual representation of feasible locations honoring an oil saturation constraint, according to an implementation.

FIG. 8 illustrates a visual representation 800 of feasible locations honoring an oil saturation constraint, according to an implementation. For example, the oil saturation map in FIG. 7 can be in the form of a text or image file and converted to a saturation matrix. Each element in the saturation matrix indicates the oil saturation level at the corresponding grid block. To impose the constraint of saturation level higher than 0.5, the saturation matrix is converted to a binary matrix as follows:

$$A(I, J) = \begin{cases} 1, & \text{if } S(I, J) \geq 0.5 \\ 0, & \text{Otherwise} \end{cases}$$

where (I,J) is the spatial location index of the grid block, S is the saturation matrix, and A is the binary matrix associated with the saturation constraint. The visual representation 800 shows white areas (that is, areas represented by ones in the binary matrix) as feasible locations with saturation larger than 0.5 while black areas as locations that do not honor the saturation constraint. For example, area 802 represents a feasible area and area 804 for an infeasible area.

Figure 9:
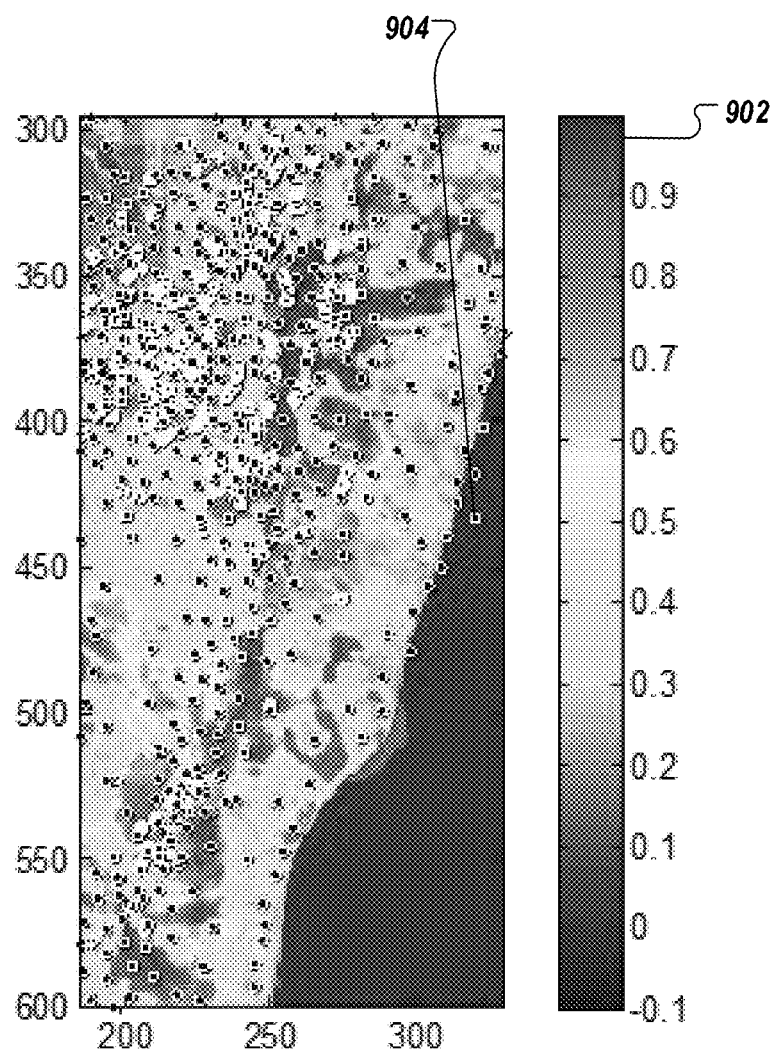
FIG. 9 is a map showing locations of existing wells, according to an implementation.

FIG. 9 is a map 900 showing locations of existing wells, according to an implementation. The black dots in the map 900 depict the existing wells. The oil saturation map in FIG. 7 is also shown in FIG. 9. Color bar 902 depicts a mapping between colors of a color spectrum and a continuous range of an oil saturation level (for example, similar to that of FIGS. 7 and 14). It can be observed that some of the existing wells are not in areas of oil saturation level higher than 0.5. For example, well 904 is in a blue area where the oil saturation level is about 0.

FIG. 10 illustrates a square mesh 1000 surrounding an existing well with a distance equivalent to a minimum well separation distance, according to an implementation. To efficiently find locations that honor the minimum well separation constraint of 625 m, a square mesh 1000 surrounding an existing well 1002 can be created. The distance from the well 1002 to the side of the square mesh 1000 is 625 m. A square mesh can be created for every existing well in FIG. 9.

Figure 11:
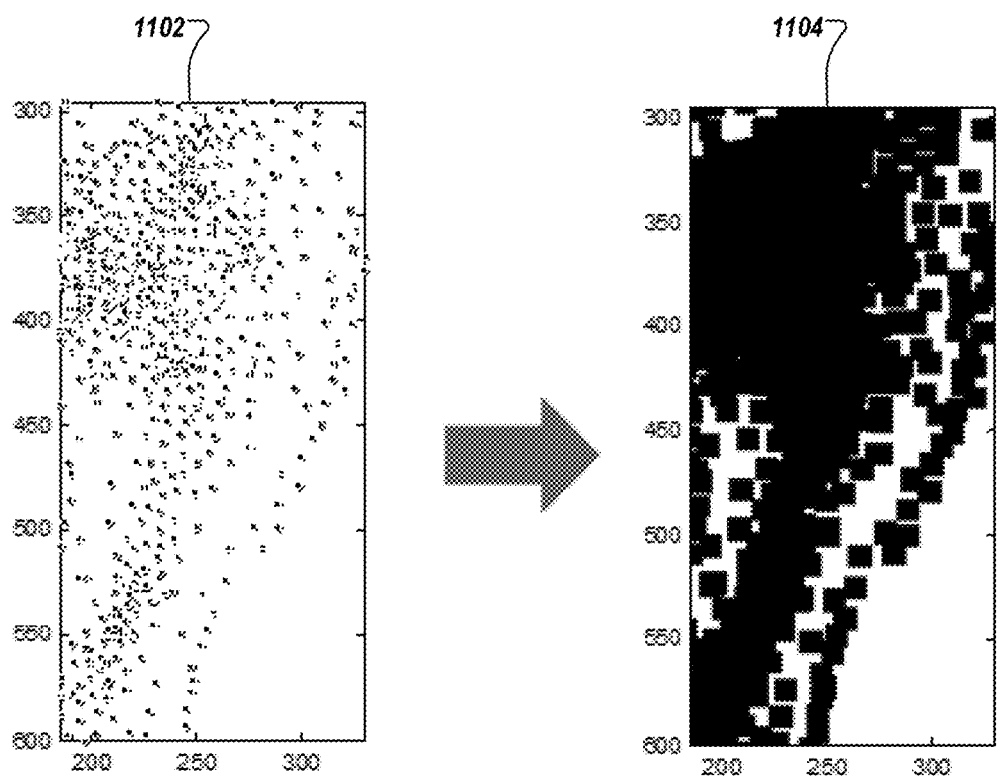
FIG. 11 illustrates a process of generating feasible locations honoring a minimum well separation constraint, according to an implementation.

FIG. 11 illustrates a process 1100 of generating feasible locations honoring a minimum well separation constraint, according to an implementation. A map 1102 shows locations of existing wells (that is, the same well locations as in FIG. 9). To generate a binary matrix associated with the minimum well separation constraint, the squared mesh described in FIG. 10 is applied to each existing well, and grid blocks inside a square mesh are assigned a value of zero while a value of one for grid blocks outside the square mesh. A visual representation 1104 shows white areas (that is, areas represented by ones in the binary matrix) as feasible locations based on the minimum well separation while black areas as infeasible locations.

Figure 12:
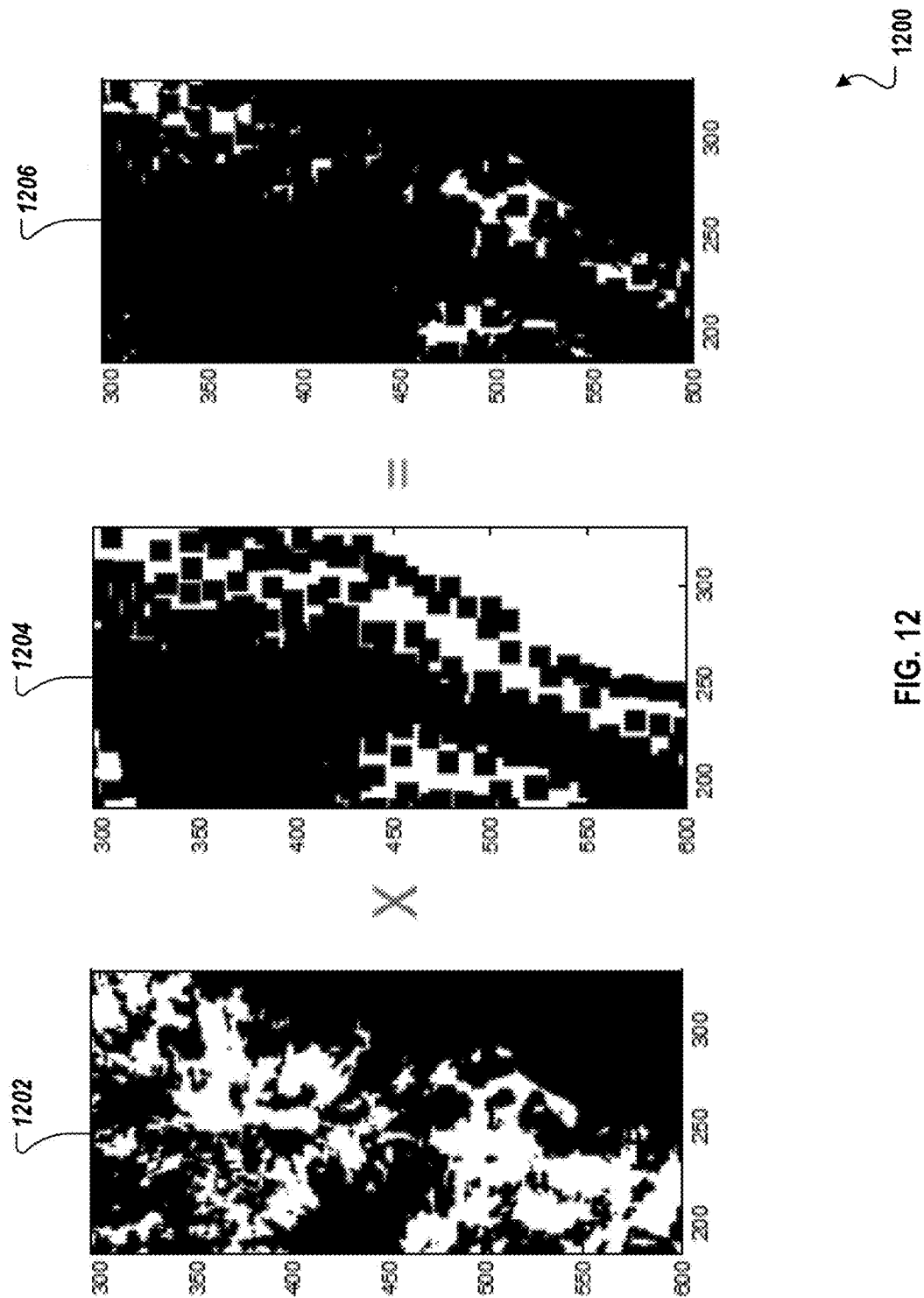
FIG. 12 illustrates a process of generating feasible locations honoring both an oil saturation constraint and a minimum well separation constraint, according to an implementation.

FIG. 12 illustrates a process 1200 of generating feasible locations honoring both an oil saturation constraint and a minimum well separation constraint, according to an implementation. A visual representation 1202 shows feasible locations honoring the oil saturation constraint (that is, the same feasible locations as in FIG. 8), and a visual representation 1204 shows feasible locations honoring the minimum well separation constraint (that is, the same feasible locations as in FIG. 11). To identify feasible regions honoring both constraints, an overall constraint matrix can be generated by convolving the binary matrices associated with the oil saturation constraint and the minimum well separation constraint, for example, multiplying corresponding elements from the two binary matrices. A visual representation 1206 of the overall constraint matrix shows white areas as feasible locations honoring both constraints.

Figure 13:
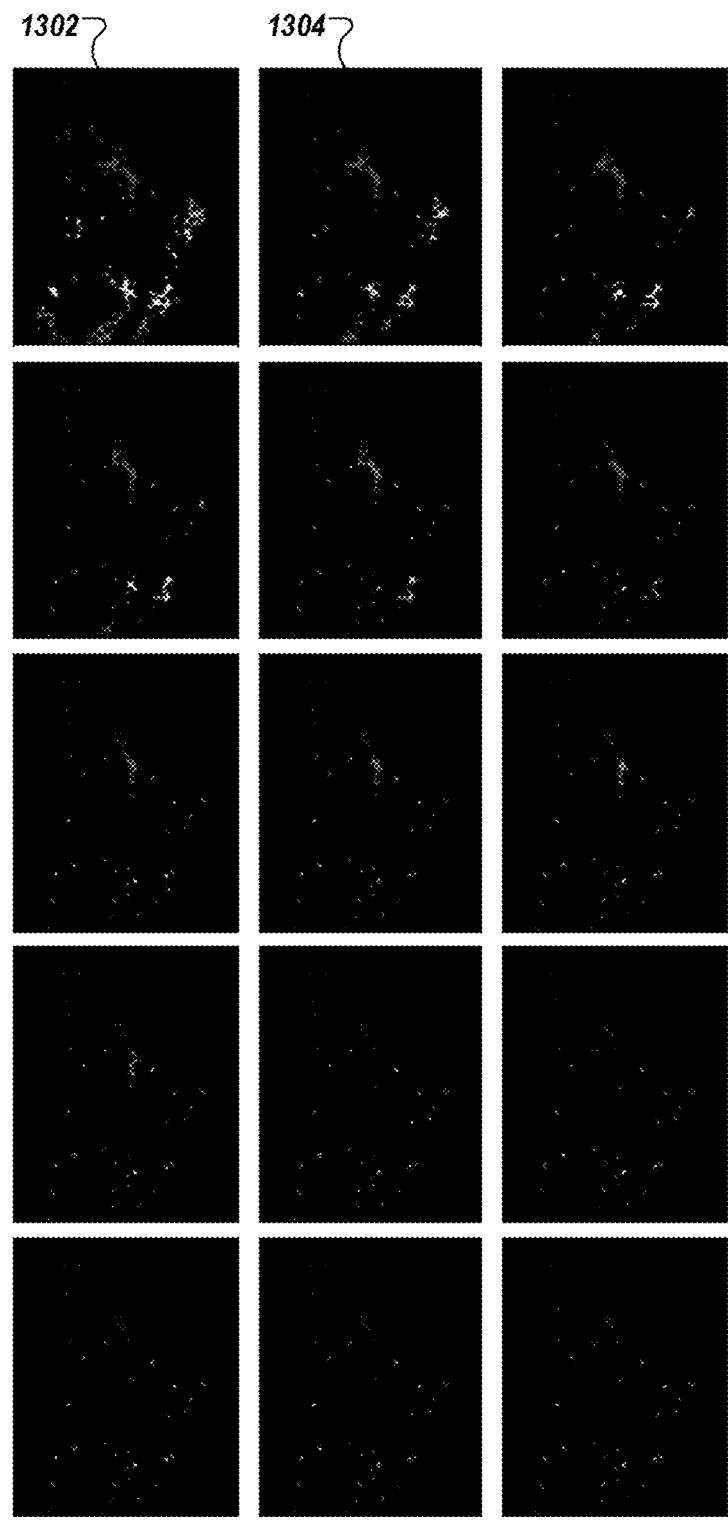
FIG. 13 illustrates an evolution of feasible regions as an optimization algorithm places new wells iteratively, according to an implementation.

FIG. 13 illustrates an evolution 1300 of feasible regions as an optimization algorithm places new wells iteratively, according to an implementation. A total of 15 iterations have been performed and method 100 stops when there is no improvement in well performance (for example, the NPV or recovery factor) after two successive iterations or the sizes of the feasible regions are too small for drilling a new well. FIG. 13 includes 15 maps, sequentially illustrating feasible regions after each of the 15 iterations starting from the upper-left corner map and in an order from left-to-right and from top-to-bottom. For example, map 1302 shows feasible regions after the first iteration, map 1304 after the second iteration, and map 1306 after the fifteenth iteration. At the end of each iteration, square meshes as in FIG. 10 are generated for newly placed wells and the DFS is used to identify and tag updated feasible regions. After each iteration, fewer feasible areas are available due to the newly placed wells. Illustrated non-black colors in the 15 maps (for example, white and gray as illustrated in FIG. 13) represent feasible regions for drilling a new well. In some implementations, the non-black colors can be a color within the color spectrum illustrated in FIGS. 7, 9, and 14.

Figure 14:
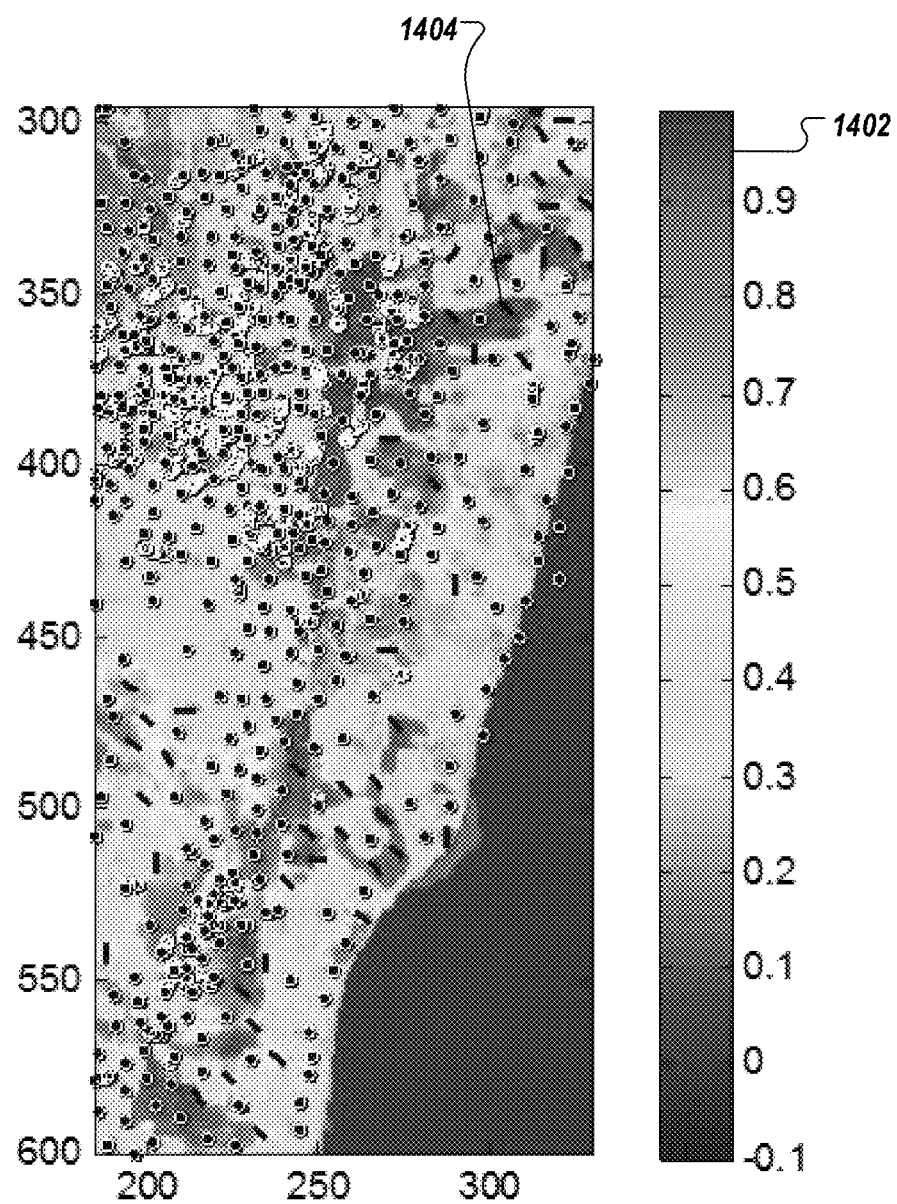
FIG. 14 is a map showing optimal well locations, according to an implementation.

FIG. 14 is a map 1400 showing optimal well locations, according to an implementation. The black lines in the map 1400 represent optimal newly placed wells while the black dots are existing wells. The oil saturation map in FIG. 7 is also shown in FIG. 14. Color bar 1402 depicts a mapping between colors of a color spectrum and a continuous range of an oil saturation level (for example, similar to that of FIGS. 7 and 9). It can be observed that the optimal new wells are drilled in areas that have an oil saturation higher than 0.5 (that is, in areas of red, orange, or yellow) in addition to honoring the minimum well separation distance. For example, the new well 1404 is placed in the red area where the oil saturation level is higher than 0.9. Most optimal wells are oriented toward northwest-southeast by design to avoid intersecting unwanted fractures. If such an orientation is not feasible, the well can be oriented to other direction that may be specified by a user preference.

Figure 15:
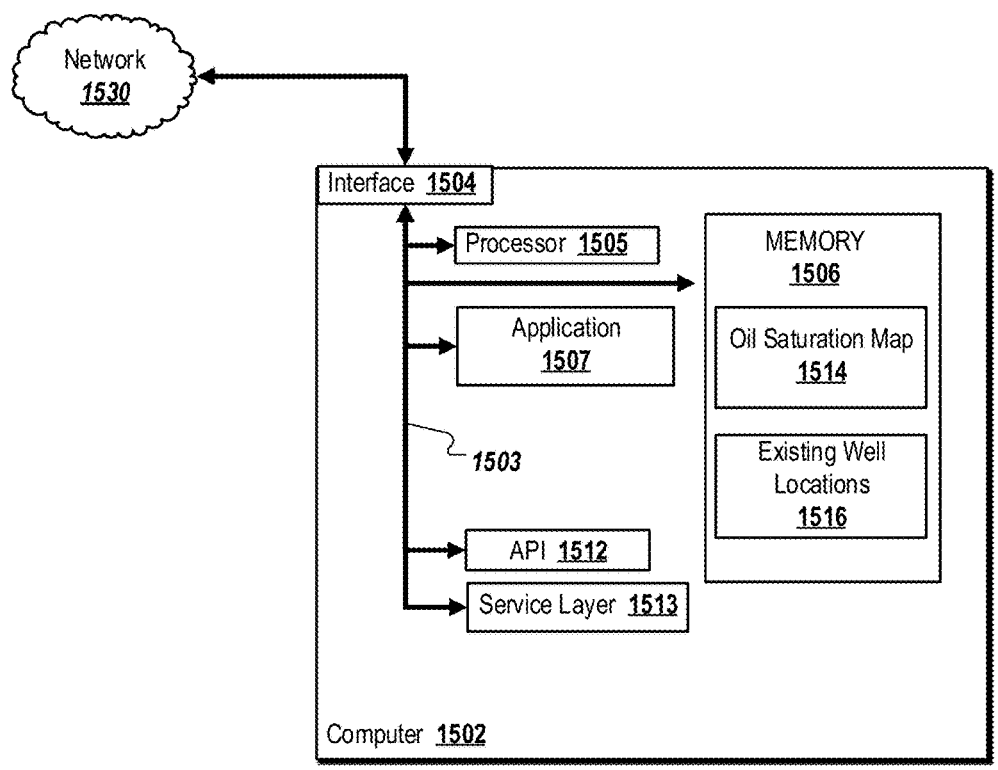
FIG. 15 is a block diagram illustrating an exemplary computer system (ECS) used to provide optimal well placement, according to an implementation.

Turning to FIG. 15, FIG. 15 is a block diagram illustrating an exemplary computer system (ECS) 1500 used to provide optimal well placement according to an implementation. In some implementations, the ECS 1500 includes a computer 1502 and network 1530.

The illustrated computer 1502 is intended to encompass a computing device such as a server, desktop computer, laptop/notebook computer, wireless data port, smart phone, personal data assistant (PDA), tablet computing device, one or more processors within these devices, or any other suitable processing device, including both physical or virtual instances (or both physical and virtual instances) of the computing device. The computer 1502 may comprise a computer that includes an input device, such as a keypad, keyboard, touch screen, or other device (not illustrated) that can accept user information, and an output device (not illustrated) that conveys information associated with the operation of the computer 1502, including digital data, visual or audio information (or a combination of visual and audio information), or a user interface.

The computer 1502 can serve as a client or a server (or both a client and server). In typical implementations, the computer 1502 acts as either a parallel processing node, host for a software agent, or a host for a database, DFS algorithm, reservoir simulator, optimization algorithm, user interface, optimal well placement application, or other application consistent with this disclosure (even if not illustrated). The illustrated computer 1502 is communicably coupled with a network 1530. In some implementations, one or more components of the computer 1502 may be configured to operate within a parallel-processing or cloud-computing-based environment (or both a parallel-processing and cloud-computing-based environment). Implementations of the computer 1502 can also communicate using message passing interface (MPI) or other interface over network 1530.

At a high level, the computer 1502 is an electronic computing device operable to receive, transmit, process, store, or manage data and information associated with optimal well placement. According to some implementations, the computer 1502 may also include or be communicably coupled with a simulation server, application server, e-mail server, web server, caching server, streaming data server, business intelligence (BI) server, or other server (or combination of servers).

The computer 1502 can receive requests over the network 1530 from an application 1507 (for example, executing on another computer 1502) and respond to the received requests by processing the said requests in an appropriate software application 1507. In addition, requests may also be sent to the computer 1502 from internal users (for example, from a command console or by other appropriate access method), external or third-parties, other automated applications, as well as any other appropriate entities, individuals, systems, or computers.

Each of the components of the computer 1502 can communicate using a system bus 1503. In some implementations, any or all of the components of the computer 1502, both hardware or software (or a combination of hardware and software), may interface with each other and the interface 1504 over the system bus 1503 using an application programming interface (API) 1512 or a service layer 1513 (or a combination of the API 1512 and service layer 1513). The API 1512 may include specifications for routines, data structures, and object classes. The API 1512 may be either computer-language independent or dependent and refer to a complete interface, a single function, or even a set of APIs. The service layer 1513 provides software services to the computer 1502 or a system of which the computer 1502 is a part. The functionality of the computer 1502 may be accessible for all service consumers using this service layer. Software services, such as those provided by the service layer 1513, provide reusable, defined business functionalities through a defined interface. For example, the interface may be software written in JAVA, C++, or other suitable languages providing data in extensible markup language (XML) format or other suitable formats. While illustrated as an integrated component of the computer 1502, alternative implementations may illustrate the API 1512 or the service layer 1513 (or both the API 1512 and service layer 1513) as stand-alone components in relation to other components of the computer 1502. Moreover, any or all parts of the API 1512 or the service layer 1513 (or both the API 1512 and service layer 1513) may be implemented as child or sub-modules of another software module, enterprise application, or hardware module without departing from the scope of this disclosure. 100781 The computer 1502 includes an interface 1504. Although illustrated as a single interface 1504 in FIG. 15, two or more interfaces 1504 may be used according to particular needs, desires, or particular implementations of the computer 1502. The interface 1504 is used by the computer 1502 for communicating with other systems in a distributed environment—including a parallel processing environment—connected to the network 1530 (whether illustrated or not). Generally, the interface 1504 comprises logic encoded in software or hardware (or both software and hardware) in a suitable combination and operable to communicate with the network 1530. More specifically, the interface 1504 may comprise software supporting one or more communication protocols associated with communications over network 1530.

The computer 1502 includes a processor 1505. Although illustrated as a single processor 1505 in FIG. 15, two or more processors may be used according to particular needs, desires, or particular implementations of the computer 1502. Generally, the processor 1505 executes instructions and manipulates data to perform the operations of the computer 1502. Specifically, the processor 1505 executes the functionality required for optimal well placement.

The computer 1502 also includes a memory 1506 that holds data for the computer 1502 or other components of a system of which the computer is a part. Although illustrated as a single memory 1506 in FIG. 15, two or more memories may be used according to particular needs, desires, or particular implementations of the computer 1502. While memory 1506 is illustrated as an integral component of the computer 1502, in alternative implementations, memory 1506 can be external to the computer 1502. In some implementations, memory 1506 can hold and reference one or more of information associated with constraints such as an oil saturation map 1514 and existing well locations 1516.

The application 1507 is an algorithmic software engine providing functionality according to particular needs, desires, or particular implementations of the computer 1502 or a system of which the computer 1502 is a part, particularly with respect to functionality required for optimal well placement. For example, application 1507 can serve as (or a portion of) a database, DFS algorithm, reservoir simulator, optimization algorithm, user interface, optimal well placement application, or other application consistent with this disclosure (whether illustrated or not). Although illustrated as a single application 1507, the application 1507 may be implemented as multiple applications 1507 on the computer 1502. In addition, although illustrated as integral to the computer 1502, in alternative implementations, the application 1507 can be external to and execute apart from the computer 1502.

There may be any number of computers 1502 associated with a computer system performing functions consistent with this disclosure. Further, the term "client," "user," and other appropriate terminology may be used interchangeably as appropriate without departing from the scope of this disclosure. Moreover, this disclosure contemplates that many users/processes may use one computer 1502, or that one user/process may use multiple computers 1502.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatuses, devices, and machines for processing data, including by way of example, a programmable processor, a computer, or multiple processors or computers. The apparatus can also be or further include special purpose logic circuitry, for example, a central processing unit (CPU), a co-processor (for example, a graphics/visual processing unit (GPU/VPU)), a FPGA (field programmable gate array), or an ASIC (application specific integrated circuit). In some implementations, the data processing apparatus or special purpose logic circuitry (or both the data processing apparatus and special purpose logic circuitry) may be hardware-based or software-based (or a combination of hardware-based and software-based). The apparatus can optionally include a code that creates an execution environment for computer programs, for example, a code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, a FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically-erasable programmable read-only memory (EEPROM), and flash memory devices; magnetic disks, for example, internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business or dynamic information (or a combination of objects or data), and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of UI elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back end, middleware, or front end components. The components of the system can be interconnected by any form or medium of wireline or wireless digital data communication (or a combination of wireline or wireless communication). Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or combination of communication networks), all or a portion of the Internet or any other communication system or systems at one or more locations. The network may communicate with, for example, Internet Protocol (IP) packets, Frame Relay frames, Asynchronous Transfer Mode (ATM) cells, voice, video, data, or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other and the interface using an API or a service layer (or combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of API and service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation or integration of various system modules and components in the implementations described above should not be understood as requiring such separation or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   receiving information associated with a plurality of constraints for well placement in a reservoir field;
   for each of the plurality of constraints, converting information associated with the constraint into a binary matrix;
   determining an overall constraint matrix by multiplying corresponding elements from the binary matrices associated with the plurality of constraints, wherein the overall constraint matrix includes only zeros and ones;
   determining feasible regions for well placement based on the overall constraint matrix;
   determining optimal well locations within the feasible regions; and
   outputting the optimal well locations.

2. The method of claim 1, wherein converting information associated with the constraint into a binary matrix including assigning a value of one to an element in the binary matrix if a corresponding location honors the constraint and a value of zero otherwise.

3. The method of claim 1, wherein the feasible regions are determined by using a depth-first search algorithm.

4. The method of claim 1, wherein each of the feasible regions is assigned a unique identifier.

5. The method of claim 1, wherein the plurality of constraints include a minimum well separation distance.

6. The method of claim 5, further comprising iteratively determining optimal well locations that includes:
   at each iteration, determining one optimal well location within each of the feasible regions;
   in response to the determined optimal well locations, updating the binary matrix associated with the constraint of the minimum well separation distance;
   updating the overall constraint matrix based on the updated binary matrix; and
   updating feasible regions for well placement for a next iteration.

7. A non-transitory, computer-readable medium storing computer-readable instructions, the instructions executable by a computer and configured to:
   receive information associated with a plurality of constraints for well placement in a reservoir field;
   for each of the plurality of constraints, convert information associated with the constraint into a binary matrix;
   determine an overall constraint matrix by multiplying corresponding elements from the binary matrices associated with the plurality of constraints, wherein the overall constraint matrix includes only zeros and ones;
   determine feasible regions for well placement based on the overall constraint matrix;
   determine optimal well locations within the feasible regions; and
   output the optimal well locations.

8. The non-transitory, computer-readable medium of claim 7, wherein converting information associated with the constraint into a binary matrix including assigning a value of one to an element in the binary matrix if a corresponding location honors the constraint and a value of zero otherwise.

9. The non-transitory, computer-readable medium of claim 7, wherein the feasible regions are determined by using a depth-first search algorithm.

10. The non-transitory, computer-readable medium of claim 7, wherein each of the feasible regions is assigned a unique identifier.

11. The non-transitory, computer-readable medium of claim 7, wherein the plurality of constraints include a minimum well separation distance.

12. The non-transitory, computer-readable medium of claim 11, comprising one or more instructions to iteratively determine optimal well locations that includes:
    at each iteration, determining one optimal well location within each of the feasible regions;
    in response to the determined optimal well locations, updating the binary matrix associated with the constraint of the minimum well separation distance;
    updating the overall constraint matrix based on the updated binary matrix; and
    updating feasible regions for well placement for a next iteration.

13. A system, comprising:
    a computer memory;
    a hardware processor interoperably coupled with the computer memory and configured to:
       receive information associated with a plurality of constraints for well placement in a reservoir field;
       for each of the plurality of constraints, convert information associated with the constraint into a binary matrix;
       determine an overall constraint matrix by multiplying corresponding elements from the binary matrices associated with the plurality of constraints, wherein the overall constraint matrix includes only zeros and ones;
       determine feasible regions for well placement based on the overall constraint matrix;
       determine optimal well locations within the feasible regions; and
       output the optimal well locations.

14. The system of claim 13, wherein converting information associated with the constraint into a binary matrix including assigning a value of one to an element in the binary matrix if a corresponding location honors the constraint and a value of zero otherwise.

15. The system of claim 13, wherein the feasible regions are determined by using a depth-first search algorithm.

16. The system of claim 13, wherein the plurality of constraints include a minimum well separation distance.

17. The system of claim 16, wherein the hardware processor is further configure to iteratively determine optimal well locations that includes:
    at each iteration, determining one optimal well location within each of the feasible regions;
    in response to the determined optimal well locations, updating the binary matrix associated with the constraint of the minimum well separation distance;
    updating the overall constraint matrix based on the updated binary matrix; and updating feasible regions for well placement for a next iteration.

\* \* \* \* \*